US008826509B2

(12) United States Patent  (10) Patent No.: US 8,826,509 B2
Bergmann et al.  (45) Date of Patent: Sep. 9, 2014

(54) AUTOMATED MULTI-STAGE MACHINE FOR FORMING COMPOSITE DETAILS

(75) Inventors: Blaise F. Bergmann, Clearwater, KS (US); Michael C. Dowling, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 333 days.

(21) Appl. No.: 13/278,959

(22) Filed: Oct. 21, 2011

(65) Prior Publication Data

US 2013/0097849 A1    Apr. 25, 2013

(51) Int. Cl.
*B23P 11/00* (2006.01)
*B23P 19/00* (2006.01)
*B28B 5/00* (2006.01)
*B28B 15/00* (2006.01)
*B23P 17/04* (2006.01)
*B23P 23/00* (2006.01)
*B29C 70/38* (2006.01)
*B29C 51/10* (2006.01)

(52) U.S. Cl.
CPC ............... *B23P 17/04* (2013.01); *B29C 51/10* (2013.01); *B23P 23/00* (2013.01); *B29C 70/38* (2013.01)
USPC .................. 29/430; 29/431; 29/429; 29/791; 29/822; 264/241; 425/62

(58) Field of Classification Search
USPC ............ 29/429, 430, 431, 791, 822; 264/109, 264/241; 156/379.8; 425/62
See application file for complete search history.

(56) References Cited

U.S. PATENT DOCUMENTS

| 3,809,739 | A | * | 5/1974 | Gelin | 264/297.6 |
| 4,352,769 | A | * | 10/1982 | Meyer | 264/134 |
| 4,952,366 | A | * | 8/1990 | Gelin | 264/511 |
| 5,125,149 | A | * | 6/1992 | Inaba et al. | 29/430 |
| 5,217,656 | A | * | 6/1993 | Buckley et al. | 264/490 |
| 5,328,540 | A | | 7/1994 | Clayton et al. | |
| 5,364,258 | A | * | 11/1994 | Buckley et al. | 425/501 |
| 5,382,148 | A | * | 1/1995 | Buckley | 425/174.4 |
| 5,766,541 | A | * | 6/1998 | Knutsson et al. | 264/571 |
| 5,827,392 | A | * | 10/1998 | Buckley et al. | 156/275.3 |
| 5,920,974 | A | * | 7/1999 | Bullen | 29/33 K |
| 6,478,926 | B1 | | 11/2002 | Brachos et al. | |
| 6,521,152 | B1 | * | 2/2003 | Wood et al. | 264/121 |
| 7,128,869 | B2 | * | 10/2006 | Habisreitinger et al. | 264/510 |
| 7,198,739 | B2 | * | 4/2007 | La Forest et al. | 264/29.2 |
| 2005/0150265 | A1 | * | 7/2005 | Kim et al. | 72/60 |
| 2006/0230594 | A1 | * | 10/2006 | Stengele et al. | 29/431 |
| 2007/0063370 | A1 | * | 3/2007 | Steinberger et al. | 264/109 |

FOREIGN PATENT DOCUMENTS

JP          04361025 A   *  12/1992   ............. B29C 67/20

* cited by examiner

*Primary Examiner* — Essama Omgba
(74) *Attorney, Agent, or Firm* — Hovey Williams LLP (57) ABSTRACT

A system for forming composite material parts comprises a charge station, a tool station, a forming station, a cooling station, a pick and place apparatus, and a transfer unit. The charge station may receive a first charge. The tool station may receive a first tool. The forming station may form a second charge against a second tool. The cooling station may cool a third charge and a third tool. The pick and place apparatus may retrieve the first charge from the charge station and the first tool from the tool station and transport both the first charge and the first tool to the forming station. The transfer unit may transport the second charge and the second tool from the forming station to the cooling station while at the same time transporting the third charge and the third tool from the cooling station to the tool station.

29 Claims, 11 Drawing Sheets

AUTOMATED MULTI-STAGE MACHINE FOR FORMING COMPOSITE DETAILS

BACKGROUND OF THE INVENTION

1. Field of the Invention

Embodiments of the present invention relate to automated systems for forming composite material parts.

2. Description of the Related Art

Composite material parts may be formed in a multi-step process. First, a tool with a shape of the finished part may be retrieved and placed on a work station. A pre-assembled composite material charge may be placed on the tool. The charge and the tool may be heated to a forming temperature, at which point, the charge may be pressed against the tool. After the charge is properly formed into the shape of the finished part, the charge is allowed to cool while still being pressed against the tool. After the cooling is complete, the part and the tool may be removed from the station so that another part can be formed. This type of serial process occupies the work station for long periods of time, preventing other charges from being processed and decreasing productivity.

SUMMARY OF THE INVENTION

Embodiments of the present invention solve the above-mentioned problems and/or other problems and provide a distinct advance in the art of composite forming techniques. More particularly, embodiments of the invention provide methods and an automated system for more efficiently forming a plurality composite material parts.

Some embodiments of the present invention provide a system for forming composite material parts comprising a charge station, a tool station, a forming station, a cooling station, a gantry, a pick and place apparatus, and a transfer unit. The charge station may be positioned at a forward-most position and may receive a first charge. The tool station may be positioned adjacent to the charge station and rearward therefrom and may receive a first tool. The forming station may be positioned at a rearward-most position and may form a second charge against a second tool. The cooling station may be positioned between the tool station and the forming station and may cool a third charge and a third tool.

The gantry may retrieve tools from a tool storage area and deliver the tools to the tool station. The pick and place apparatus may retrieve the first charge from the charge station and the first tool from the tool station and transport them to the forming station. The transfer unit may transport the second charge and the second tool from the forming station to the cooling station while at the same time transporting the third charge and the third tool from the cooling station to the tool station.

Other embodiments of the present invention provide a method for forming composite material parts comprising the steps of: placing a first charge in a charge station and a first tool in a tool station; forming a second charge against a second tool using a forming station; cooling a third charge and a third tool using a cooling station; moving the first charge and the first tool to the forming station using a pick and place apparatus; and moving the second charge and the second tool to the cooling station and the third charge and the third tool to the tool station using a transfer unit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
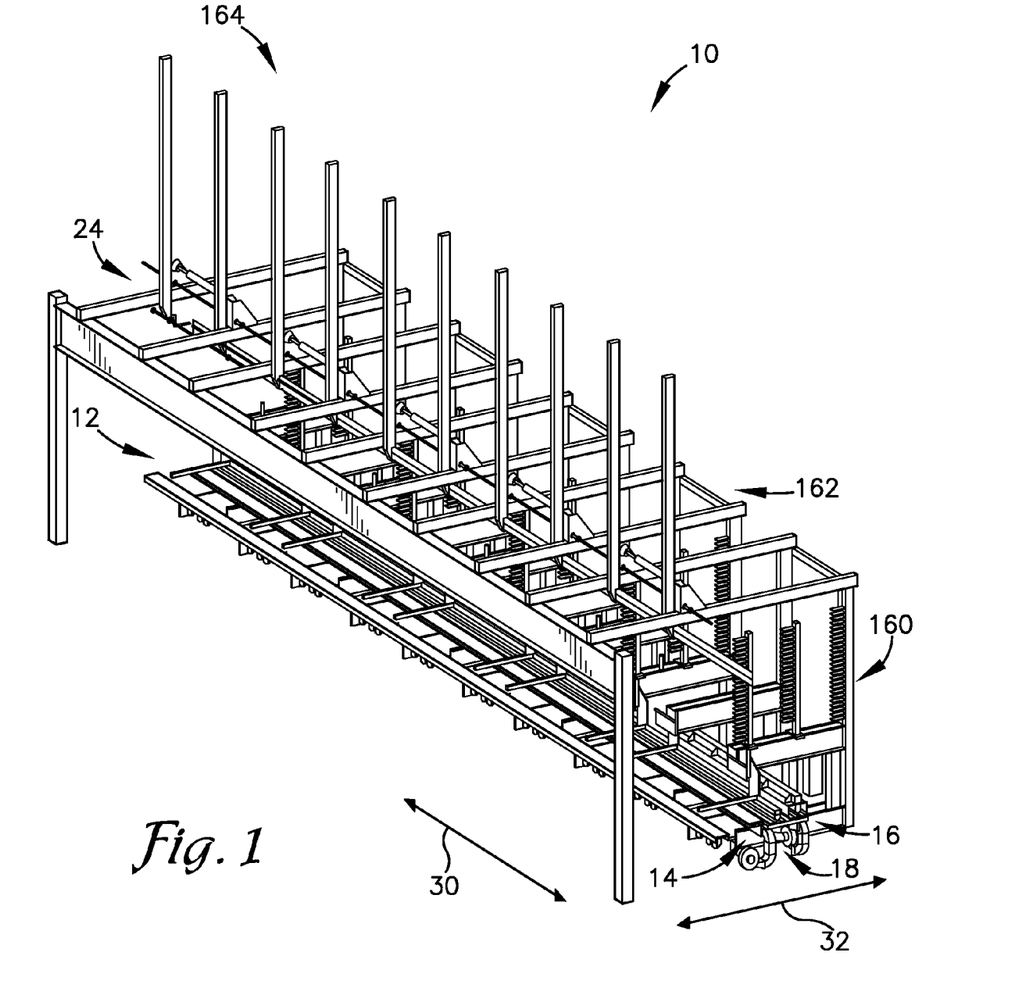
FIG. 1 is a front perspective view of a system for forming composite material parts, constructed in accordance with various embodiments of the present invention.
Figure 2:
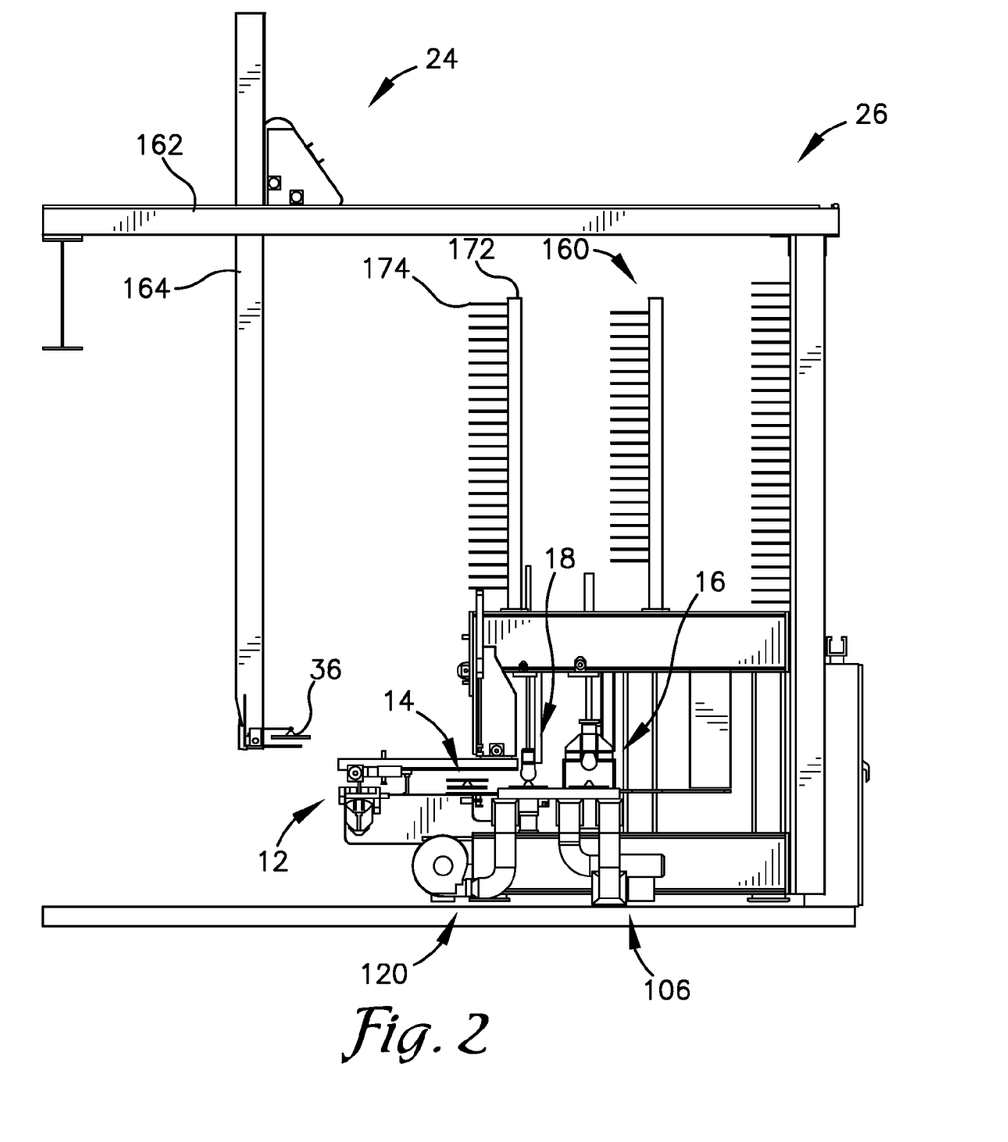
FIG. 2 is a side elevational view of the system.
Figure 3:
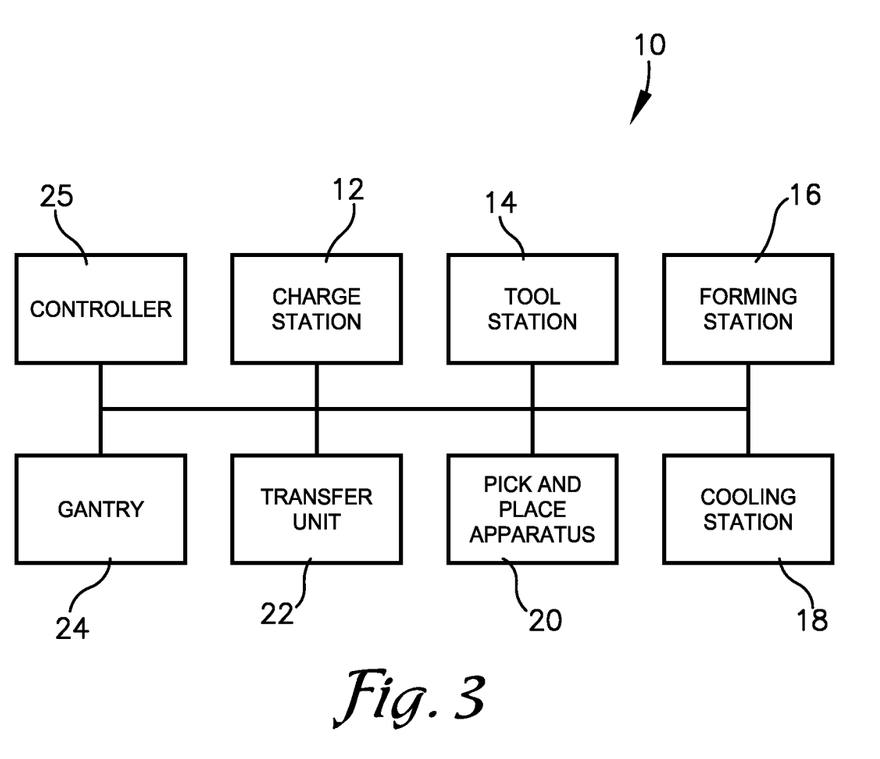
FIG. 3 is a block diagram of components of the system.

An automated multi-stage system 10 for forming composite material parts and constructed in accordance with various embodiments of the present invention is shown in FIGS. 1 and 2. The system 10 may broadly comprise a charge station 12, a tool station 14, a forming station 16, a cooling station 18, a pick and place apparatus 20, a transfer unit 22, and a gantry 24. The system 10 may further include a frame 26 with a plurality of rigid beams that are connected together to provide support and positioning for all of the other components. In addition, the system 10 may include a system controller 25, as seen in FIG. 3, to control the operation of the system 10.

The system 10 may be modular in nature in order to accommodate parts of any size—particularly, large-sized parts. Thus, the system 10 may be created from a plurality of modules 28, shown in FIG. 4, which may be placed side by side to form the system 10. The terms "axial" and "lateral" may be used throughout this application to indicate directions relative to the system 10. Since the system 10 is often used to create elongated parts, an axial direction 30 is along the longer dimension of the system 10, while a generally orthogonal lateral direction 32 is along the shorter dimension of the system 10, as seen in FIG. 1. In addition, the terms "front", "forward", "rear", and "rearward" may be used. Front and rear refer to opposing ends along the lateral direction 32, such that, as seen in FIGS. 2 and 5, front and forward are to the left side of the figure, and rear and rearward are to the right side of the figure.

The charge station 12, shown in FIGS. 3-7, generally accepts a composite material charge 34, also known as a blank. The charge 34 is processed, as described below, to create a finished part 36. The charge 34 may be preassembled from composite material as is known in the art to include at least two constituent components—a reinforcement material and a matrix material. Examples of the reinforcement material that may be used with the present invention include, but are not limited to, fiber materials such as carbon fiber, boron fiber, fiberglass, aramid fiber, ceramic fiber, and the like. In the case of fiber-based reinforcement materials, the fiber may exist in one of at least two forms—either preimpregnated (prepreg), in which the fiber may be coated with a matrix material that is uncured, such as uncured resin, or unenhanced (dry), with no additives to the fiber. The matrix material may include resins, polymers, epoxies, and the like, among others. The charge 34 may have some thickness, but may be generally flat. In various embodiments, the charge 34 may have the profile or outline along its edges of the finished part 36. The methods of various embodiments of the present invention may give the charge 34 three-dimensional characteristics, such as contours, curves, or other features with depth, in order to create the finished part 36.

Figures 6, 7:
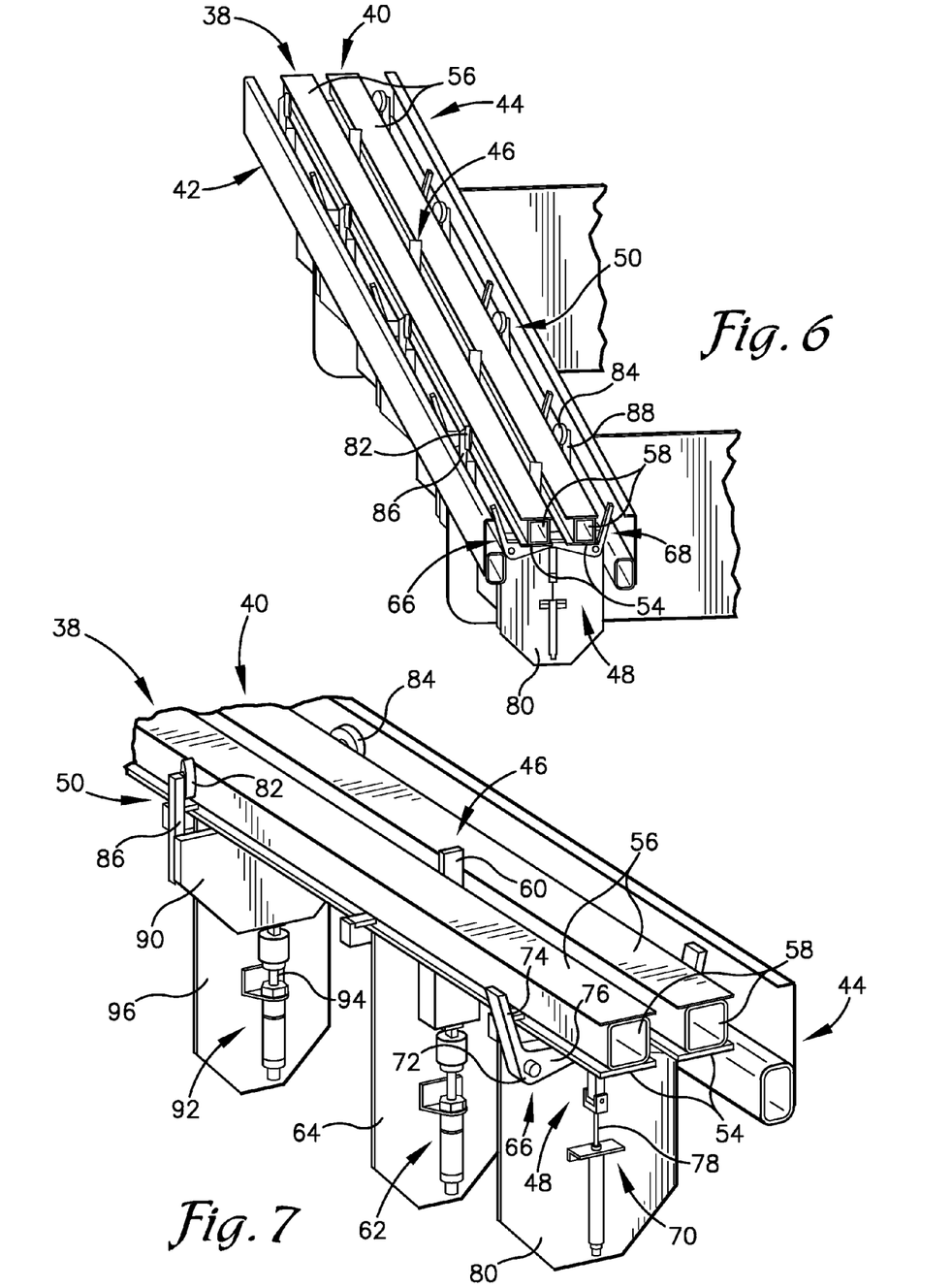
FIG. 6 is a fragmentary perspective view of the charge station.
FIG. 7 is a fragmentary perspective view of the charge station.
Figure 9:
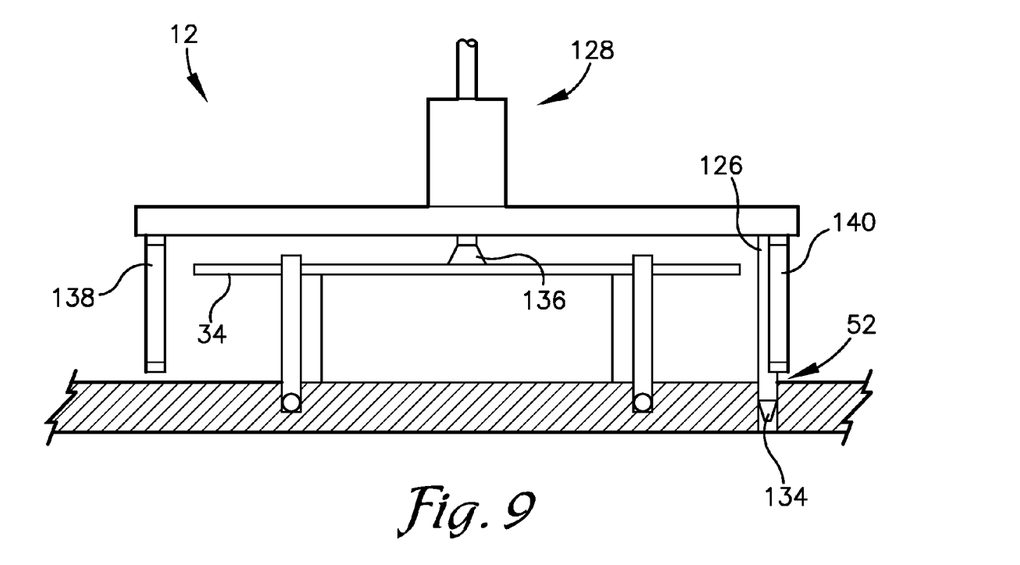
FIG. 9 is a side view of a head of the pick and place apparatus shown retrieving a charge from the charge station.

An embodiment of the charge station 12, as seen in FIGS. 6-7 and 9, may include a first bar 38, a second bar 40, a first side panel 42, a second side panel 44, a plurality of end stops 46, a plurality of centering grippers 48, and a plurality of alignment rollers 50. In various embodiments, the charge station 12 may also include a first alignment feature 52, such as an alignment hole, to align with the pick and place apparatus 20. The system 10 may further include braces, brackets, or other frame members that support the charge station 12.

The first bar 38 and the second bar 40 may each include a first strip 54 and a spaced-apart second strip 56 with a tubular segment 58 positioned therebetween. In various embodiments, the first strip 54 and the second strip 56 may be formed from stainless steel. When installed in the charge station 12, the first bar 38 and the second bar 40 may be spaced apart and may extend the length of the system 10. The first bar 38 and the second bar 40 may be oriented such that the first strip 54 is on the bottom and the second strip 56 is on the top. The charge 34 may be placed upon the second strip 56 of the first bar 38 and the second bar 40.

The first side panel 42 and the second side panel 44 may be generally elongated and constructed from metal. The first side panel 42 may be positioned on the front side of the charge station 12, and the second side panel 44 may be positioned on the rear side. The upper portions of the first side panel 42 and the second side panel 44 are generally aligned with the first bar 38 and the second bar 40.

Figure 8:
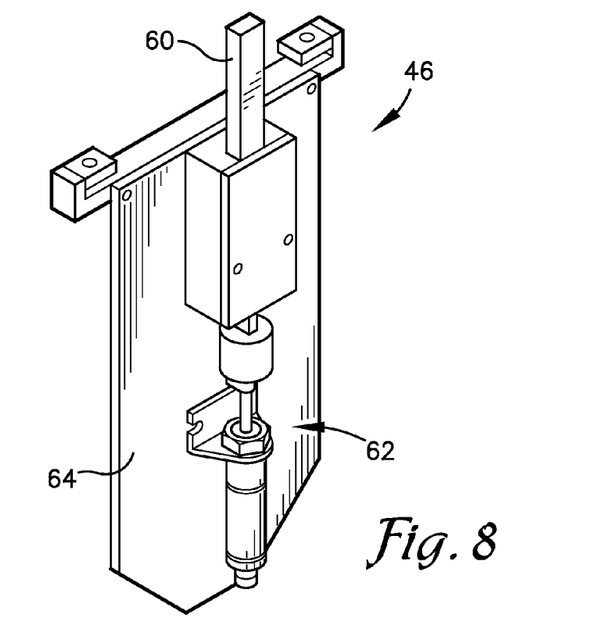
FIG. 8 is a perspective view of an end stop, which is utilized in the charge station.

The end stops 46 may include an end stop post 60 and an end stop actuator 62, as seen in FIGS. 7 and 8. The end stop post 60 may be formed from generally rigid materials such as metals or hardened plastics. The end stop actuator 62 may include known actuating mechanisms, such as pneumatic or hydraulic. The end stop post 60 may extend and retract from the end stop actuator 62. The end stop 46 may be mounted on a first plate 64 that is attached to the first strip 54 of both the first bar 38 and the second bar 40. Once installed, the end stop post 60 may be positioned between the first bar 38 and the second bar 40. The distal end of the end stop post 60 may rise above the second strip 56 when extended, and may fall below the second strip 56 when retracted.

The centering grippers 48, as seen in FIGS. 6-7, may include a first arm 66, a second arm 68, and a centering gripper actuator 70. The first arm 66 and the second arm 68 may both include an elbow 72 coupled to a first segment 74 and a second segment 76. The first segment 74 may be oriented at an angle of between about 90° and about 180° with respect to the second segment 76, although, generally, the angle is closer to 90°. The centering gripper actuator 70 may be of a known actuator type and may include a centering gripper actuator rod 78 that retracts and extends from the centering gripper actuator 70. The centering gripper actuator 70 may be mounted on a second plate 80 that is attached to the first strip 54 of both the first bar 38 and the second bar 40. The first segments 74 of the first arm 66 and the second arm 68 may be rotatably coupled to the centering gripper actuator rod 78. The elbows of the first arm 66 and the second arm 68 are rotatably attached to the second plate 80, allowing the first arm 66 and the second arm 68 to pivot about the point at which the elbows are attached. The second segments 76 of the first arm 66 and the second arm 68 are generally positioned on opposing sides of the first bar 38 and the second bar 40 and are free to swing toward and away from the first bar 38 and the second bar 40. The centering gripper 48 may be thought to close as the second segments 76 of the first arm 66 and the second arm 68 swing toward the first bar 38 and the second bar 40. The centering gripper 48 may be thought to open as the second segments 76 of the first arm 66 and the second arm 68 swing away from the first bar 38 and the second bar 40.

In some embodiments, the centering gripper actuator rod 78 may extend from the centering gripper actuator 70 as the centering gripper 48 opens, and the centering gripper actuator rod 78 may retract into the centering gripper actuator 70 as the centering gripper 48 closes. In other embodiments, the centering gripper actuator 70 and the centering gripper actuator rod 78 may function differently while still allowing the centering gripper 48 to open and close. During operation, the centering gripper 48 may open and close in order to align the charge 34 in the lateral direction 32.

The alignment rollers 50, as seen in FIGS. 6-7, may include a first roller 82, a second roller 84, a first roller arm 86, a second roller arm 88, an alignment roller block 90, and an alignment roller actuator 92. The first roller 82 and the second roller 84 may be generally wheel shaped and constructed from rigid materials, such as metals or hardened plastics. The first roller 82 may be rotatably coupled to the first roller arm 86, and the second roller 84 may be rotatably coupled to the second roller arm 88. The first roller arm 86 may be connected to the first strip 54 of the first bar 38, and the second roller arm 88 may be connected to the first strip 54 of the second bar 40. The first roller arm 86 and the second roller arm 88 may both be connected to the alignment roller block 90. The alignment roller actuator 92 may be of a known actuator type and may include a alignment roller actuator rod 94 that retracts and extends from the alignment roller actuator 92. The alignment roller actuator 92 may be mounted on a third plate 96. The alignment roller block 90 may be coupled to the alignment roller actuator rod 94. Thus, the alignment roller actuator 92 may raise and lower the first roller 82 and the second roller 84 as necessary by extending and retracting the alignment roller actuator rod 94.

The charge station 12 generally receives a charge 34 on the second strip 56 of the first bar 38 and the second bar 40. Before the charge 34 is placed on the charge station 12, the alignment rollers 50 may be actuated to rise up. Typically, the charge 34 is loaded onto the charge station 12 from one end of the system 10 and moved or guided in the axial direction 30. The alignment rollers 50 may facilitate this movement to get the charge 34 into position in the axial direction 30. Once the charge is in a rough position, the alignment rollers 50 may be lowered and one or more of the end stop posts 60 may be actuated to rise above the first bar 38 and the second bar 40. The charge 34 may then be pressed against the end stops to align the charge 34 to a coordinate location in the axial direction 30 that is programmed in the system controller 25. The centering gripper 48 may be actuated to close and align the charge 34 to a coordinate location in the lateral direction 32 that is programmed in the system controller 25.

The tool station 14, as shown in FIGS. 2, 5, 10, and 12-13, generally accepts a tool 98, also known as a die or a mold. The tool 98 is generally rigid and may have the three-dimensional male shape of the finished part 36. The tool station 14 may include a platform 100 on which to place the tool 98. The upper surface of the platform 100 may be elevated such that when a tool 98 is placed on the platform 100, there is a gap between the tool station 14 and the lower surface of the tool 98. The tool station 14 may further include components (not shown), such as end stops, that align the tool 98 in the axial direction 30. In various embodiments, the tool station 14 may also include a second alignment feature 102, such as an alignment hole, to align with the pick and place apparatus 20.

The forming station 16 generally includes components that provide forming of the charge 34 onto the tool 98. Accordingly, an embodiment of the forming station 16 may include a heating element to supply thermal energy in order to heat the charge 34, the tool 98, or the combination of the two. In various embodiments, the forming station 16 may further include forming components such as a drape or a membrane and a vacuum source, wherein the membrane is pulled against the charge 34 and the tool 98 either by mechanical force, vacuum on the inside of the membrane, or high pressure on the outside of the membrane. In other embodiments, the forming station 16 may include forming components such as a top surface mold that has a female shape of the tool 98, wherein the top surface mold may be pressed against the upper surface of the charge 34.

An exemplary forming station 16, as shown in FIGS. 2, 5, and 11-13, is positioned near the rear of the system 10 and may include a first upper surface 104, a heat source 106, a forming head 108, and a lateral alignment mechanism 110. The first upper surface 104 generally receives the tool 98 and the charge 34. The heat source 106 may be positioned below the first upper surface 104 and generally provides heat to the tool 98 and the charge 34. The forming head 108 generally forms the charge 34 and may include a first bladder 112 and a shroud 114. The first bladder 112 generally extends in the axial direction 30 and is inflatable to approximately 30 pounds per square inch (psi). The shroud 114 may include front and rear panels that surround the first bladder 112 on the front and rear sides. The lateral alignment mechanism 110 may include vertically oriented posts that move in the lateral direction 32 in order to align the tool 98 before the forming process begins. The forming station 16 may further include components that raise and lower the first bladder 112 and the shroud 114 in order to move the tool 98 and the charge 34 from the tool station 14 to the forming station 16. In various embodiments, the forming station 16 may also include a third alignment feature 116, such as an alignment hole, to align with the pick and place apparatus 20.

The cooling station 18 generally includes components that provide cooling of the charge 34 and the tool 98 while still maintaining pressure on the charge 34. An exemplary cooling station 18, as shown in FIGS. 2, 4, and 12-13, is positioned in front of the forming station 16 and may include a second upper surface 118, a ventilation source 120, and a cooling head 122. The second upper surface 118 generally receives the tool 98 and the charge 34. The ventilation source 120 may be positioned below the second upper surface 118 and may include a blower to circulate ambient air to the charge 34 and the tool 98. The cooling head 122 may include a second bladder 124 which generally extends in the axial direction 30 and is inflatable to approximately 2 pounds psi. The cooling station 18 may further include components that raise and lower the second bladder 124 in order to move the tool 98 and the charge 34 from the tool station 14 to the forming station 16 (since the cooling station 18 is positioned between the tool station 14 and the forming station 16).

The pick and place apparatus 20 generally includes robotic components that are capable of moving the charge 34, the tool 98, or the combination of the two from the charge station 12 to the tool station 14 and the forming station 16. The function of the pick and place apparatus 20 is to generally move the charge 34, the tool 98, or the combination of the two rearward. An exemplary pick and place apparatus 20, as shown in FIGS. 2, 5, and 9-11, may include an alignment post 126, a pick and place head 128, a horizontal arm 130, and a vertical arm 132. The alignment post 126 may extend in the vertical direction from the pick and place head 128 and may include a tapered end 134 that couples with the first alignment feature 52 of the charge station 12, the second alignment feature 102 of the tool station 14, and the third alignment feature of the forming station 16.

The pick and place head 128 may include a plurality of vacuum devices 136, such as suction cups, a plurality of front tool arms 138, and a plurality of rear tool arms 140. The vacuum devices 136 may be located in the center of the pick and place head 128 in the lateral direction 32. The front tool arms 138 may be positioned at the front end of the pick and place head 128 and may extend downward from the pick and place head 128. Each front tool arm 138 may include a first finger 142 positioned at roughly a right angle to the front tool arm 138. The first finger 142 may rotate about the axis of the front tool arm 138. Each rear tool arm 140 may include a second finger 144 positioned at roughly a right angle to the rear tool arm 140. The second finger 144 may rotate about the axis of the rear tool arm 140.

The horizontal arm 130 may include an elongated beam that is oriented in the lateral direction. The horizontal arm 130 may also include a first set of tracks or rails that couple with the pick and place head 128 to allow the pick and place head 128 to slide in the lateral direction, or toward the front of the system 10 and the rear of the system 10. The horizontal arm 130 may further include a second set of tracks or rails that couple with the vertical arm 132 and allow the horizontal arm 130 to slide in the lateral direction. The vertical arm 132 may be slidably coupled to a portion of the frame 26, such that the vertical arm 132, the horizontal arm 130, and the pick and place head 128 may all move in the vertical direction, or up and down.

During operation of the pick and place apparatus 20, the pick and place head 128 may be moved forward on the horizontal arm 130 to the charge station 12 to pick up a charge 34. The pick and place head 128 may be lowered with the alignment post 126 engaging the first alignment feature 52. The vacuum device 136 may contact the upper surface of the charge 34 with enough downward force to retain the charge 34, as seen in FIG. 9. The pick and place head 128 and the charge 34 may then be raised from the charge station 12 and moved rearward to the tool station 14 to pick up a tool 98.

Figure 10:
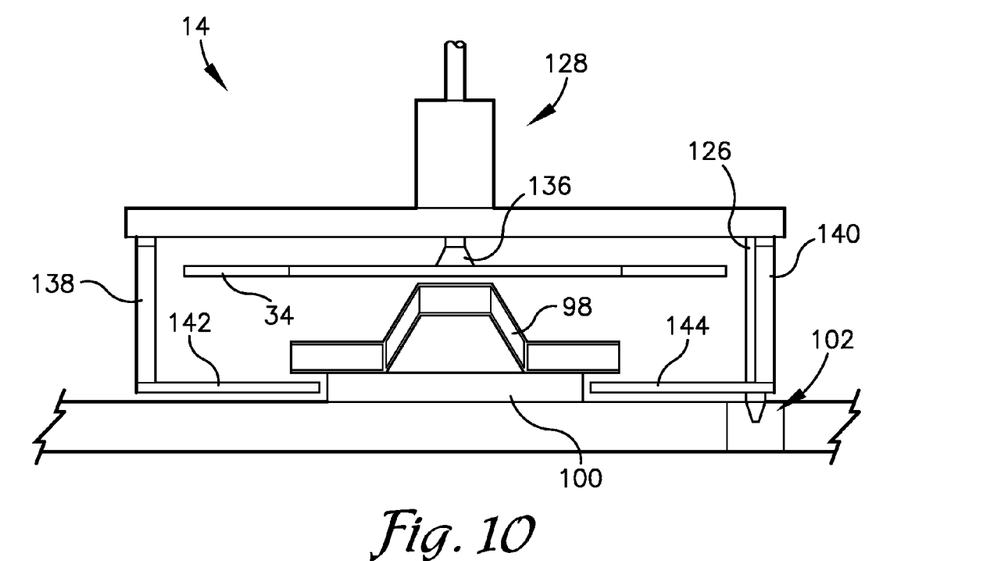
FIG. 10 is a side view of the head of the pick and place apparatus shown retrieving a tool from the tool station while still retaining the charge.

The pick and place head 128, still retaining the charge 34, may be lowered with the alignment post 126 engaging the second alignment feature 102. The front tool arm 138 and the rear tool arm 140 may both be rotated such that the first finger 142 and the second finger 144 are positioned beneath the tool 98, as seen in FIG. 10. The pick and place head 128 may be raised while the vacuum device 136 retains the charge 34 and the first finger 142 and second finger 144 retain the tool 98.

Figure 11:
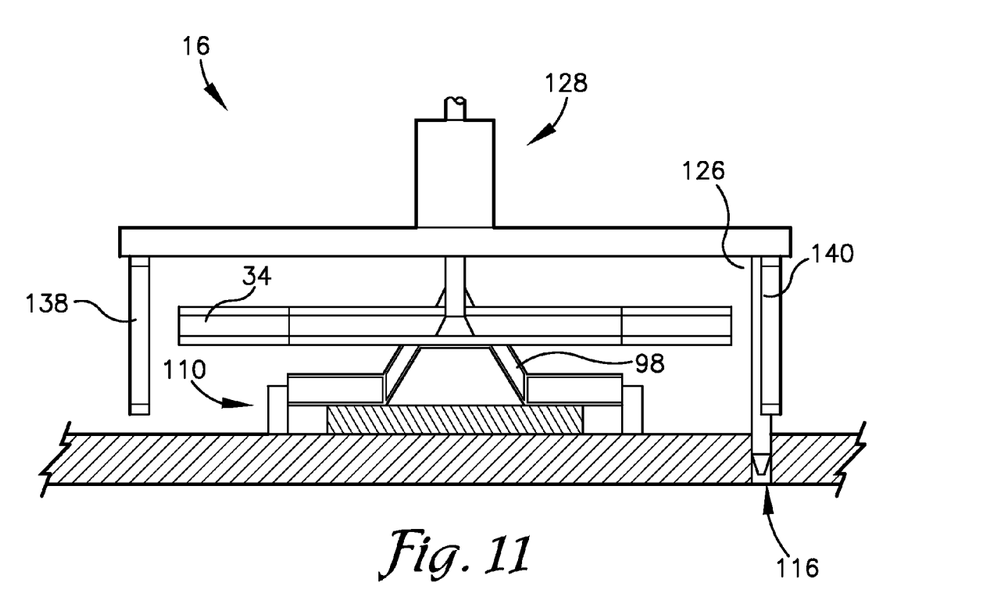
FIG. 11 is a side view of the head of the pick and place apparatus shown placing the tool and the charge on the forming station.

The horizontal arm 130 and the pick and place head 128 may be moved rearward to the forming station 16 to place the tool 98 and the charge 34. The pick and place head 128 may be lowered with the alignment post 126 engaging the third alignment feature 116. The front tool arm 138 and the rear tool arm 140 may both be rotated such that the first finger 142 and the second finger 144 move out from under the tool 98. The forming station 16 may then align the tool 98 in the lateral direction 32. The pick and place head 128 may extend the vacuum device 136 downward to press the charge 34 onto the tool 98, as shown in FIG. 11. The vacuum device 136 may release the charge 34. The pick and place head 128 may retract the vacuum device 136 and the pick and place head 128 may be raised. The horizontal arm 130 and the pick and place head 128 may then be moved forward away from the forming station 16 and the cooling station 18 during the forming and cooling cycles.

Figure 12:
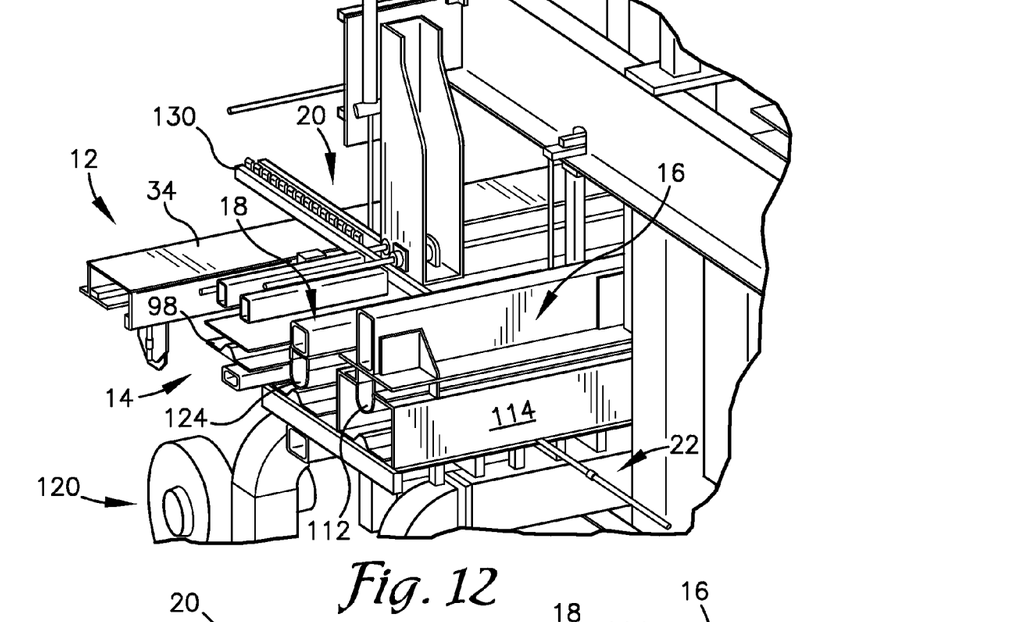
FIG. 12 is a fragmentary rear perspective view of the system.
Figure 13:
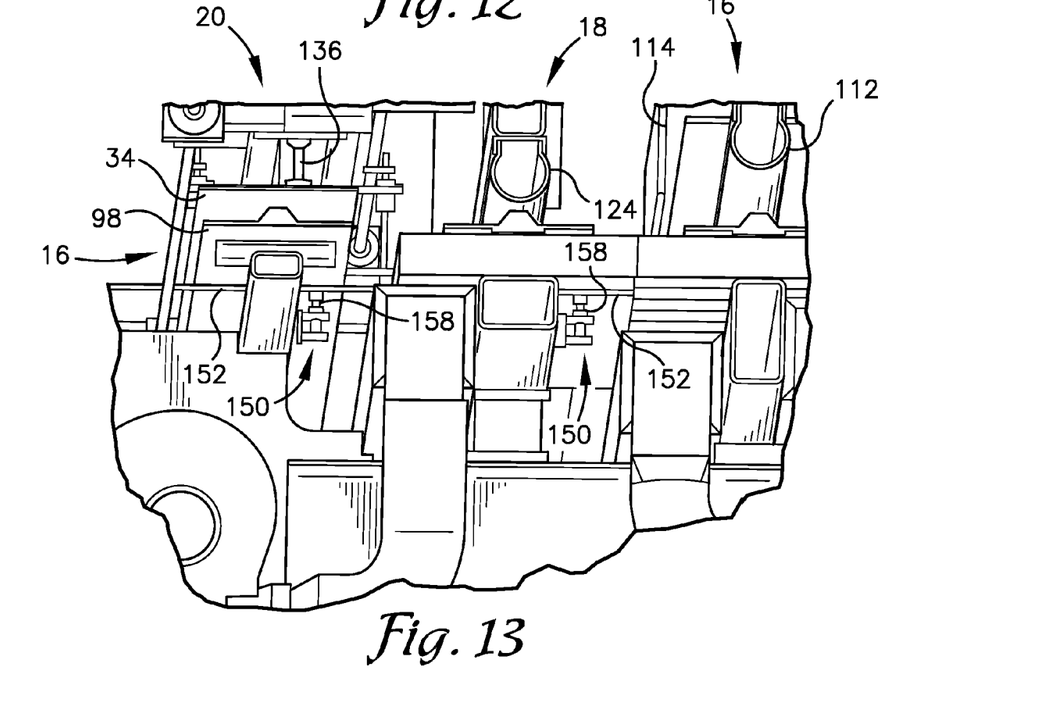
FIG. 13 is a fragmentary bottom view of the tool station, the cooling station, the forming station, and a transfer unit.
Figure 14:
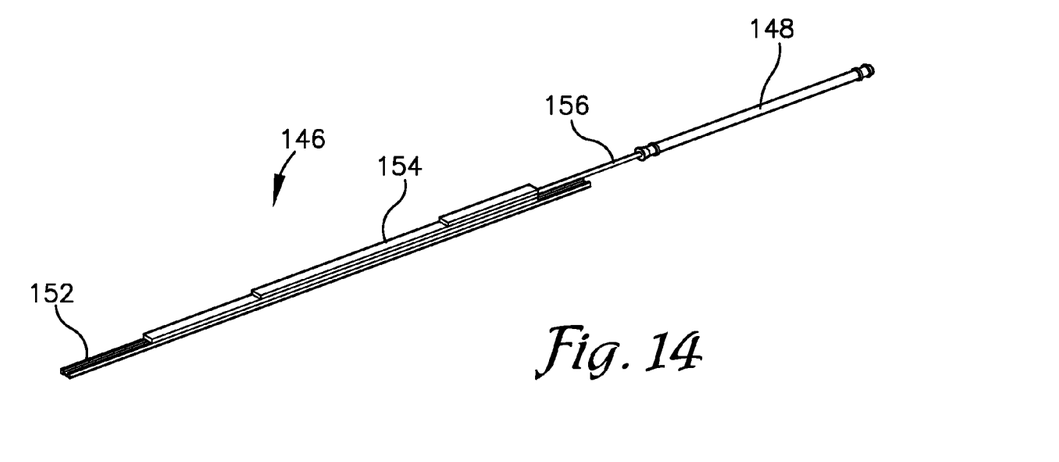
FIG. 14 is a perspective view of the transfer unit.

The transfer unit 22, as shown at least in part in FIGS. 12-14, generally transfers the charge 34 and the tool 98 forward. The transfer unit 22 may include a plurality of rails 146, a plurality of air cylinders 148, and a plurality of transfer unit actuators 150. Each rail 146 may include a slot 152 in which a block 154 may slide. The block 154 may include one or more features on its upper surface that contact or couple with the lower surface of the tool 98. The air cylinder 148 may be an actuating device that includes an air cylinder rod 156 which can be extending from and retracted into the air cylinder 148 through the use of air pressure or vacuum within the air cylinder 148. The air cylinder rod 156 may be coupled to the block 154 in order to slide the block 154 along the slot 152 of the transfer unit rail 146. The transfer unit actuator 150 includes a transfer unit actuator rod 158 which extends from and retracts into the transfer unit actuator 150.

Each rail 146 may be positioned along the lateral direction 32, embedded in the first upper surface of the forming station 16, the second upper surface 118 of the cooling station 18, and the platform 100 of the tool station 14 such that the block 154 is at or below the level of the first upper surface 104, the second upper surface 118, and the platform 100. Transfer unit actuators 150 may be positioned beneath the tool station 14, beneath the cooling station 18, and beneath the forming station 16. The transfer unit actuators 150 may be mounted on portions of the frame 26. The transfer unit actuator rods 158 may be coupled to the bottom of the rail 146.

During operation of the transfer unit 22, when the forming and cooling cycles are complete, the transfer unit actuator rods 158 may extend from the transfer unit actuators 150 in order to raise the rails 146 above the first upper surface 104, the second upper surface 118, and the platform 100 such that the block 154 engages the lower surface of the tool 98 at the forming station 16 and the tool 98 at the cooling station 18. The air cylinder rod 156 may extend from the air cylinder 148 and propel the tool 98 at the forming station 16 forward to the cooling station 18 and the tool 98 at the cooling station 18 forward to the tool station 14. The transfer unit actuator rods 158 may then retract and lower the rails 146. After the rails 146 are completely lowered, the air cylinder 148 may retract the air cylinder rod 156 and return the block 154 to its most rearward position.

Figure 15:
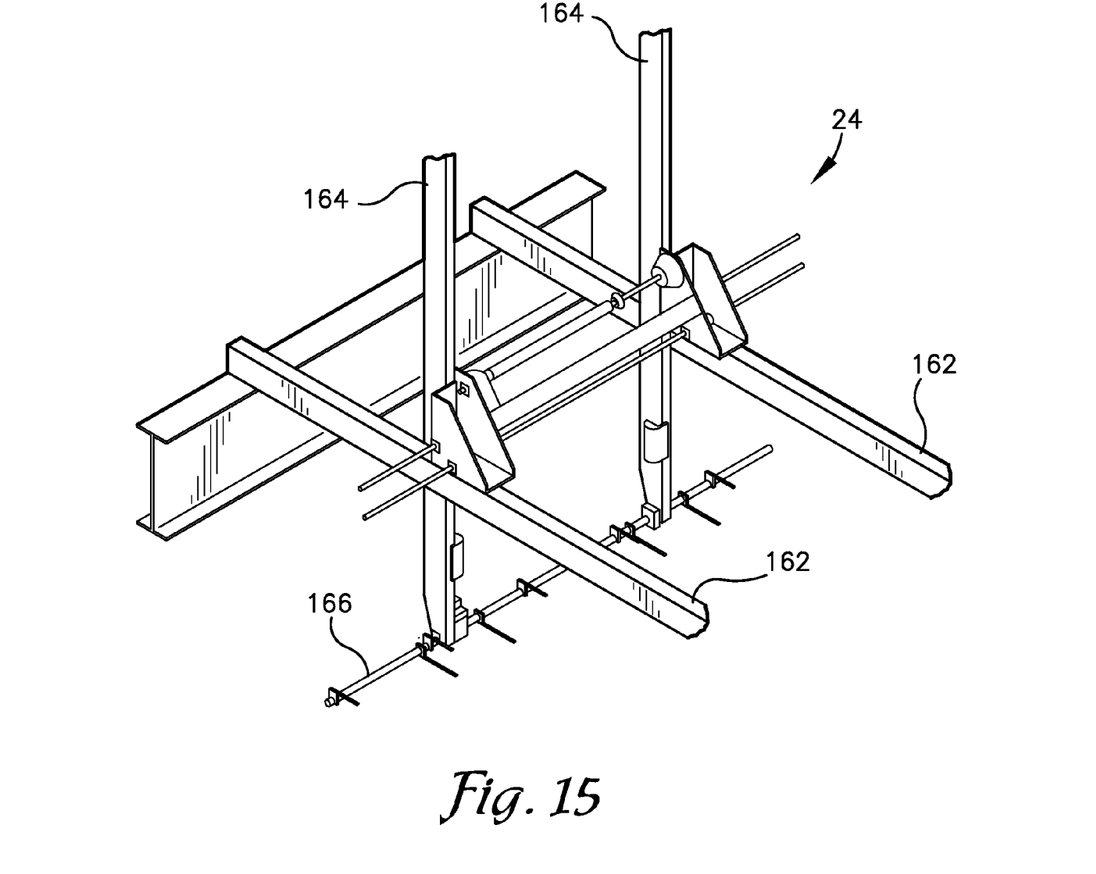
FIG. 15 is a top perspective view of a gantry used for retrieving tools from a tool storage area.
Figure 16:
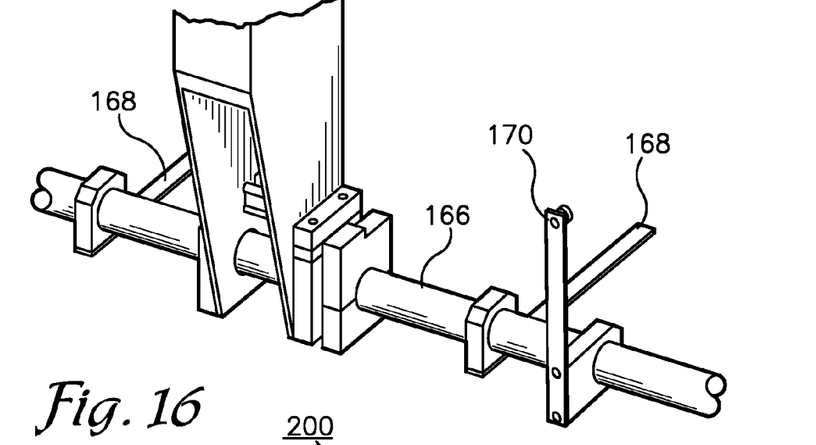
FIG. 16 is a front perspective view of a portion of the gantry.

The gantry 24, as seen in FIGS. 15-16, generally includes robotic components that are capable of transferring tools 98 to and from a tool storage area 160. An exemplary gantry 24 may include a plurality of gantry horizontal beams 162, a plurality of gantry vertical beams 164, a horizontal tube 166, a plurality of forklift arms 168, and a plurality of vacuum pickup arms 170. Each gantry horizontal beam 162 may be coupled to the frame 26 and oriented in the lateral direction 32. Each gantry vertical beam 164 may be movably coupled to a gantry horizontal beam 162, such that the gantry vertical beam 164 can move up, down, forward, and rearward with respect to the gantry horizontal beam 162. The gantry 24 may include at least one motor to drive the gantry vertical beams 164 up and down and at least one motor to drive the gantry vertical beams 164 forward and rearward. The horizontal tube 166 may be oriented in the axial direction and may be rotatably coupled to the lower end of each gantry vertical beam 164. The forklift arms 168 may be spaced apart and coupled to the horizontal tube 166 in the lateral direction 32. The vacuum pickup arms 170 may be spaced apart and coupled to the horizontal tube 166 in the lateral direction 32 and in between the forklift arms 168. Furthermore, the vacuum pickup arms 170 may be rotated on the horizontal tube 166 with respect to the forklift arms 168. In various embodiments, the vacuum pickup arms 170 may be positioned at a 90-degree angle with respect to the forklift arms 168.

Figure 4:
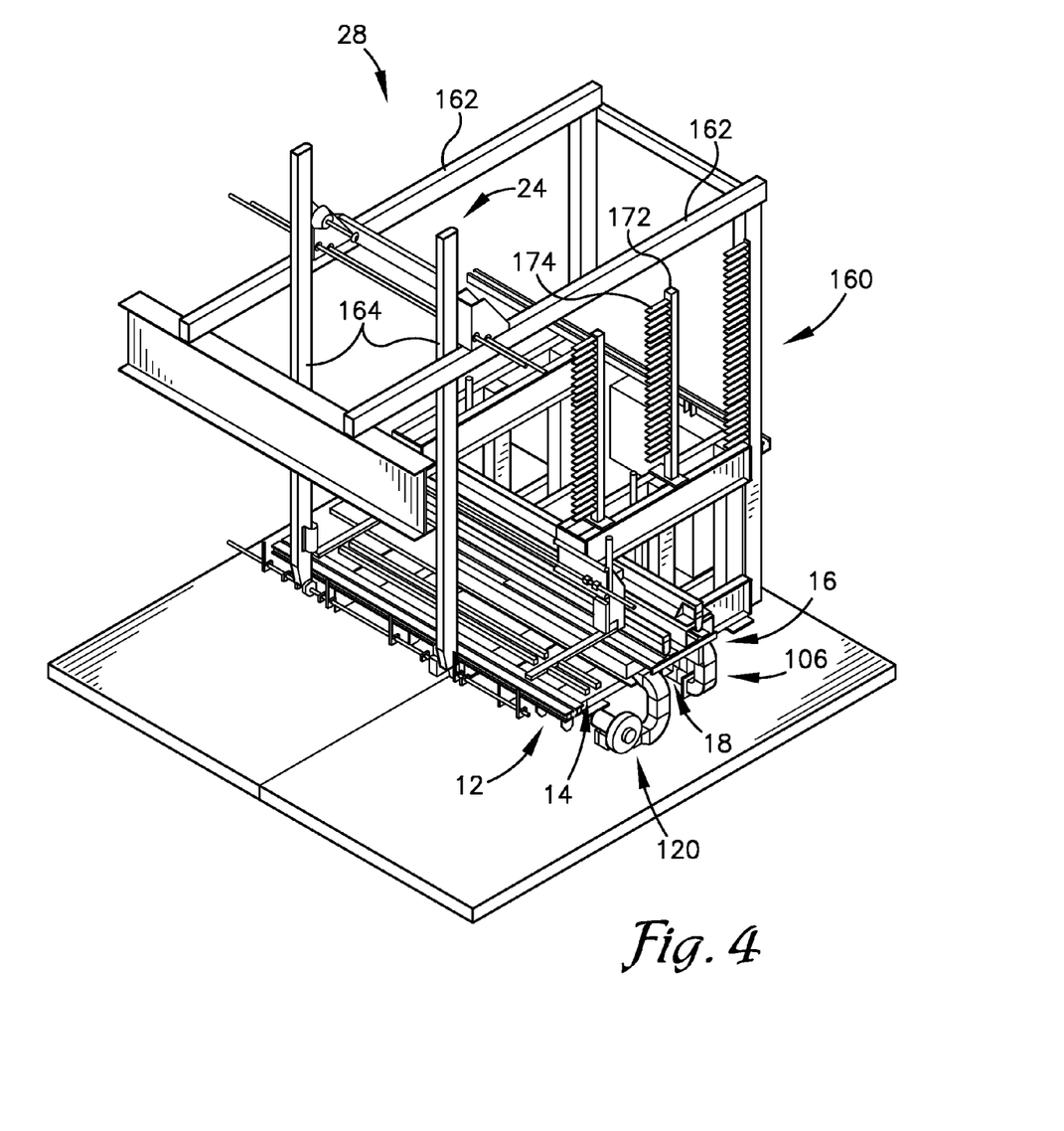
FIG. 4 is a perspective view of a module of the system.
Figure 5:
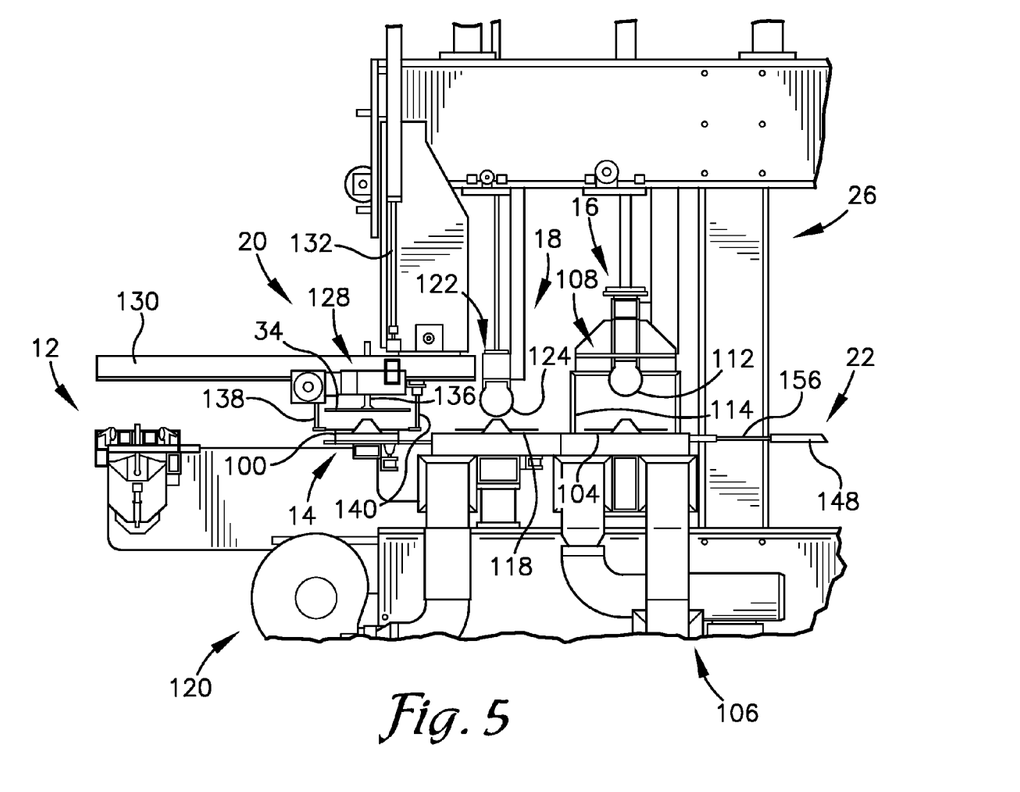
FIG. 5 is a fragmentary side elevational view of the system featuring a charge station, a pick and place apparatus, a tool station, a cooling station, and a forming station.

The tool storage area 160, as shown in FIGS. 1-2 and 4, may be located above the tool station 14, the cooling station 18, and the forming station 16. The tool storage area 160 may include a plurality of vertical storage arms 172, with each vertical storage arm 172 including a plurality of spaced-apart horizontal shelves 174. In various embodiments, the tool storage area 160 may hold 75 tools.

During operation of the gantry 24 to retrieve a tool 98 from the tool storage area 160, the gantry vertical beams 164 and the horizontal tube 166 may be raised and moved rearward. The forklift arms 168 may be inserted under the tool 98. The gantry vertical beams 164 and the horizontal tube 166 may be raised slightly to lift the tool 98 from the shelves 174. The gantry vertical beams 164 and the horizontal tube 166 may then be lowered and moved forward to deliver the tool 98 to the tool station 14, at which point the horizontal tube 166 may lower slightly to remove the forklift arms 168 from underneath the tool 98. The gantry 24 may also be used to remove a finished part 36 from the tool station 14 once the forming and cooling processes are done. The horizontal tube 166 may be moved into proximity of the tool station 14 and rotated approximately 90 degrees. The vacuum pickup arms 170 may be aligned with the finished part 36 and lowered to contact it. Vacuum may be applied and the finished part 36 may be lifted from the tool station 14. The finished part 36 may be carried forward beyond the charge station 12 where a system operator can retrieve it.

The system controller 25 may include a computer, such as a work station, a desktop computer, a laptop computer, or the like, with processing elements, such as processors, microprocessors, microcontrollers, field-programmable gate arrays, or the like. The system controller 25 may be in communication with all of the components of the system 10 and may be programmed or configured to control the sequence of actions taken by the system 10. The controller 25 may receive status or other information from the components of the system 10 and may issue commands or control signals to the components to carry out the actions. For example, the controller 25 may automatically issue commands to the pick and place apparatus 20, the transfer unit 22, and the gantry 24 to move the charges 34 and/or tools 98 between the stations. The controller 25 may also automatically instruct the forming station 16 and the cooling station 18 to begin and end their processes.

The system 10 may operate as follows. The system operator may raise the alignment rollers 50 and then place a first charge 34 on the charge station 12, typically from one end of the system 10. The first charge 34 may be moved or guided in the axial direction 30 along the charge station 12. Once the first charge 34 is roughly in position, one or more end stops 46 may be raised. The charge 34 may be pressed against the end stop 46 to be aligned in the axial direction 30. The operator may also actuate the centering grippers 48 to align the first charge 34 in the lateral direction 32. At approximately the same time, the gantry 24 may retrieve a first tool 98 from the tool storage area 160 and place the first tool 98 on the tool station 14. With the first charge 34 aligned on the charge station 12 and the first tool 98 positioned on the tool station 14, the operator may issue a command on the system controller 25 to begin processing the first charge 34.

The gantry 24 may be moved upward and clear of the tool station 14. The cooling head 122 and the forming head 108 may both be raised. The pick and place head 128 may be moved forward to the charge station 12. The pick and place head 128 may be lowered and the vacuum device 136 may acquire and retain the first charge 34. The pick and place head 128 may be raised and moved rearward to the tool station 14. The pick and place head 128 may be lowered and the first finger 142 and the second finger 144 may be moved underneath the first tool 98. The pick and place head 128 may be raised and moved rearward to the forming station 16. The pick and place head 128 may be lowered and the first tool 98 may be placed on the first upper surface 104 of the forming station 16 and the first finger 142 and the second finger 144 may be removed from underneath the first tool 98. The lateral alignment mechanism 110 may automatically align the first tool 98 in the lateral direction 32. The vacuum device 136 may be extended to press the first charge 34 against the upper surface of the first tool 98. The vacuum device 136 may release the first charge 34 and then be retracted. The pick and place head 128 may be raised and moved forward to the charge station 12.

The forming head 108 may be lowered onto the first charge 34 and the first tool 98 and a forming process may be executed. In an exemplary forming process, heat may be applied to the first charge 34 and the first tool 98 from the heat source 106 while the first bladder 112 applies pressure to the first charge 34. Other process steps may be performed as well. While the forming process is occurring, the operator may load a second charge 34 onto the charge station 12 and align the second charge 34, as described above. The operator may also request a second tool 98 to be retrieved from the tool storage area 160 and loaded onto the tool station 14. The second tool 98 may also be aligned, as described above. The pick and place head 128 may retrieve both the second charge 34 and the second tool 98, as discussed above.

Once the forming process is complete, the forming head 108 may be raised and the transfer unit 22 may move the first tool 98 and the first charge 34 forward to the cooling station 18, as discussed above with regard to the transfer unit 22. At approximately the same time, the pick and place head 128, retaining the second charge 34 and the second tool 98, moves rearward and places the second charge 34 and the second tool 98 on the first upper surface 104 of the forming tool 98. Thus, the first charge 34 and the first tool 98 move forward along the rail slots 152 of the transfer unit 22 while the second charge 34 and the second tool 98 move rearward over head in the pick and place apparatus 20.

After the pick and place head 128 has placed the second charge 34 and the second tool 98 on the first upper surface 104 of the forming station 16, the pick and place head 128 may be raised and moved forward to the charge station 12. The forming head 108 may be lowered onto the second charge 34 and the second tool 98 and the forming process may begin. The cooling head 122 may be lowered onto the first charge 34 and the first tool 98 and a cooling process may be executed. In an exemplary cooling process, the second bladder 124 may apply pressure to the charge 34 while ambient air is circulated from the ventilation source 120. Other process steps may be performed as well. While the forming process and the cooling process are occurring, the operator may load a third charge 34 onto the charge station 12 and align the third charge 34, as described above. The operator may also request a third tool 98 to be retrieved from the tool storage area 160 and loaded onto the tool station 14. The third tool 98 may also be aligned, as described above. The pick and place head 128 may retrieve both the third charge 34 and the third tool 98, as discussed above.

Once the cooling process of the first charge 34 and the forming process of the second charge 34 are complete, the forming head 108 and the cooling head 122 may both be raised. While the pick and place head 128 carries the third charge 34 and the third tool 98 over head from the tool station 14 to the forming station 16, the transfer unit 22 move the first tool 98 and the first charge 34 from the cooling station 18 to the tool station 14. At the same time, the transfer unit 22 also moves the second tool 98 and the second charge 34 from the forming station 16 to the cooling station 18. Once the third charge 34 and the third tool 98 are placed on the forming station 16 and the pick and place head 128 moves forward to the charge station 12, the forming head 108 and the cooling head 122 may both be lowered. The forming process may begin on the third charge 34, and the cooling process may begin on the second charge 34.

While the forming and cooling processes are occurring, the operator may retrieve the first charge 34 from the tool station 14. The first charge 34 is now a finished composite part, which is placed in a finished part bin or the like. The first tool 98 may be returned to the tool storage area 160 by the gantry 24, or if the first tool 98 is to be used again, it may be left on the tool station 14. The operator may retrieve a fourth charge 34 and place it on the charge station 12. If necessary, the operator may also instruct the gantry 24 to retrieve another tool 98 to be placed on the tool station 14.

The system 10 may operate as discussed above, managing three charges 34 at the same time. A first charge 34 may be in the cooling station 18 undergoing the cooling process, after having undergone the forming process. A second charge 34 may be in the forming station 16 going through the forming process. And, a third charge 34 may be held by the pick and place apparatus 20, waiting to be transported to the forming station 16 to start the forming process.

Figure 17:
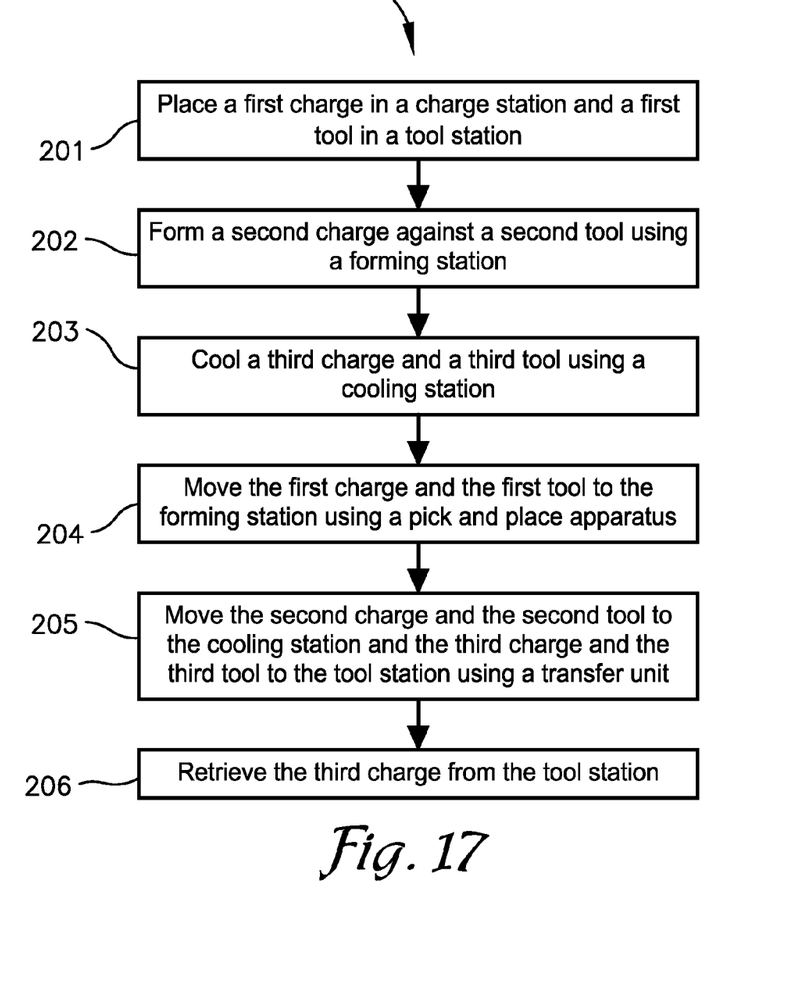
FIG. 17 is a flow diagram of at least a portion of the steps of a method of forming composite material parts.

A method 200 of forming composite parts using the system 10 in accordance with various embodiments of the present invention is listed in FIG. 17. The steps of the method 200 may be performed in the order as shown in FIG. 17, or they may be performed in a different order. Furthermore, some steps may be performed concurrently as opposed to sequentially. In addition, some steps may not be performed.

Referring to step 201, a first charge 34 is placed in a charge station 12 and a first tool 98 is placed in a tool station 14. The first charge 34 may be placed in the charge station 12 by a system operator. The first tool 98 may be retrieved from a tool storage area 160 using a gantry 24 that is controlled by the system operator. The system 10 may include an axial direction 30 and a generally orthogonal lateral direction 32. The charge station 12 may align the charge 34 in at least one of either the axial direction 30 or the lateral direction 32. The tool station 14 may align the tool 98 in at least one of either the axial direction 30 or the lateral direction 32.

Referring to step 202, a second charge 34 is formed against a second tool 98 using a forming station 16. The forming station 16 may include a heat source 106 to provide heat to the charge 34 and/or the tool 98 during a forming process. The forming station 16 may also include a forming head 108 with a pressurized first bladder 112 that applies a force to press the charge 34 against the tool 98 during the forming process.

Referring to step 203, a third charge 34 and a third tool 98 are cooled using a cooling station 18. The cooling station 18 may include a ventilation source 120 that circulates ambient air over the third charge 34 and the third tool 98 during a cooling process. The cooling station 18 may also include a cooling head 122 with a pressurized second bladder 124 to maintain pressure on the third charge 34 during the cooling process.

Referring to step 204, the first charge 34 and the first tool 98 are moved to the forming station 16 using a pick and place apparatus 20. The pick and place apparatus 20 may retrieve the first charge 34 from the charge station 12 before retrieving the first tool from the tool station 14 and then may transport both the first charge 34 and the first tool 98 to the forming station 16. Furthermore, the first charge 34 and the first tool 98 may be transported above the second charge 34, the second tool 98, the third charge 34, and the third tool 98. In addition, the first charge 34 and the first tool 98 may both be aligned in at least one of either the axial direction 30 or the lateral direction 32 while they are being transported.

Referring to step 205, the second charge 34 and the second tool 98 are moved to the cooling station 18 and the third charge 34 and the third tool 98 are moved to the tool station 14 using a transfer unit 22. The second charge 34 and the second tool 98 may be moved from the forming station 16 when the forming process is complete. The third charge 34 and the third tool 98 may be moved from the cooling station 18 when the cooling process is complete. The transfer unit 22 may include rail slots 152 that are embedded in the forming station 16, the cooling station 18, and the tool station 14 along which the second charge 34, the second tool 98, the third charge 34, and the third tool 98 are transported. The transfer unit 22 may move the second charge 34, the second tool 98, the third charge 34, and the third tool 98 all at the same time.

Referring to step 206, the third charge 34 is retrieved from the tool station 14. After the third charge 34 has completed the cooling process, it is a finished composite material part and must be removed from the tool station 14 before another charge 34 can be processed.

The system 10 may have an assembly line architecture with a charge 34 being moved in the forward direction from the forming station 16 to the cooling station 18 and finally, the tool station 14. Except, contrary to a typical assembly line, the charges 34 are both loaded to begin processing and unloaded after processing at the front or forward side of the system 10. This change in layout provides the benefit of saving space because operator access is not required at both the forward and rearward sides of the system 10. Thus, the system 10 may be located next to a wall or in a corner instead of the middle of a floor.

This change in layout could also cause interference as the currently-loading charge 34 moves rearward to the forming station 16 at the same time as the previously-loaded charges 34 are moved forward to the cooling station 18 and the tool station 14. However, the system 10 avoids potential conflicts such as this by having the pick and place apparatus 20 move the currently-loading charge rearward above the second upper surface 118 of the cooling station 18 and the first upper surface 104 of the forming station 16. At approximately the same time, the transfer unit 22 moves the previously-loaded charges 34 forward along the rail slots 152, which are at the same level as the first upper surface 104 and the second upper surface 118.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for forming composite material parts, the system operating in an axial direction and an orthogonal lateral direction, the system comprising:
   a charge station operable to receive a first charge, the charge station including
      at least one centering gripper with first and second spaced-apart arms that are operable to contact the first charge along opposing sides,
      a plurality of end stops operable to contact the first charge along opposing ends, and
      a plurality of alignment rollers that are operable to raise above an upper surface of the charge station to align and move the first charge in the axial direction,
      the at least one centering gripper in combination with the end stops and alignment rollers operable to provide alignment of the first charge in the lateral direction and the axial direction which positions the charge in a known location;

a tool station operable to receive a first tool;

a forming station operable to form a second charge against a second tool;

a cooling station operable to cool a third charge and a third tool;

a pick and place apparatus operable to retrieve the first charge from the charge station and the first tool from the tool station and transport both the first charge and the first tool to the forming station; and a transfer unit operable to transport the second charge and the second tool from the forming station to the cooling station while at the same time transporting the third charge and the third tool from the cooling station to the tool station.

2. The system of claim 1, further including a gantry to retrieve a tool from a tool storage area and transport the tool to the tool station.

3. The system of claim 1, wherein the forming station includes a head operable to press the charge against the tool.

4. The system of claim 1, wherein the forming station includes a heat source operable to supply heat to the charge and the tool.

5. The system of claim 1, wherein the pick and place apparatus includes a vacuum device to retrieve the charge.

6. The system of claim 1, wherein the pick and place apparatus includes a front tool arm with a rotatable first finger and a rear tool arm with a rotatable second finger such that the first finger and the second finger are rotated to a position underneath the tool to pick up the tool.

7. The system of claim 1, wherein the transfer unit includes a plurality of rail blocks upon which the charges and the tools are transported, each rail block being slidable within a rail slot that is oriented in the lateral direction and embedded in upper surfaces of the forming station, the cooling station, and the tool station.

8. The system of claim 7, wherein the rail blocks are positioned below the upper surfaces and actuated upward in order to transport the charges and the tools.

9. The system of claim 1, wherein the pick and place apparatus transports the first charge and the first tool above the second charge, the second tool, the third charge, and the third tool.

10. The system of claim 1, wherein the third charge is a finished composite material part when the third charge is transported from the cooling station to the tool station.

11. The system of claim 1, wherein the at least one centering gripper includes an actuator positioned below the charge station, the actuator operable to move the first and second arms toward an axial center of the first charge.

12. The system of claim 1, wherein the alignment rollers contact a lower surface of the charge and retract away from the charge after they move the charge.

13. The system of claim 1, wherein the forming station includes a lateral alignment mechanism includes first and second vertically oriented posts that contact opposing sides of the second tool and align the second tool with the second charge in the lateral direction before the second charge is formed against the second tool.

14. A system for forming composite material parts, the system operating in an axial direction and an orthogonal lateral direction, the system comprising:

a charge station positioned at a most forward position and operable to receive a first charge, the charge station including at least one centering gripper with first and second spaced-apart arms that are operable to contact the first charge along opposing sides, a plurality of end stops operable to contact the first charge along opposing ends, and a plurality of alignment rollers that are operable to raise above an upper surface of the charge station to align and move the first charge in the axial direction, the at least one centering gripper in combination with the end stops and alignment rollers operable to provide alignment of the first charge in the lateral direction and the axial direction which positions the charge in a known location;

a tool station positioned adjacent to the charge station and rearward therefrom, the tool station operable to receive a first tool;

a forming station positioned at a most rearward position and operable to form a second charge against a second tool;

a cooling station positioned between the forming station and the tool station and operable to cool a third charge and a third tool;

a pick and place apparatus operable to retrieve the first charge from the charge station and the first tool from the tool station and transport both the first charge and the first tool to the forming station; and a transfer unit operable to transport the second charge and the second tool from the forming station to the cooling station while at the same time transporting the third charge and the third tool from the cooling station to the tool station.

15. The system of claim 14, further including a gantry to retrieve a tool from a tool storage area and transport the tool to the tool station.

16. The system of claim 14, wherein the forming station includes a head operable to press the charge against the tool.

17. The system of claim 14, wherein the forming station includes a heat source operable to supply heat to the charge and the tool.

18. The system of claim 14, wherein the pick and place apparatus includes a vacuum device to retrieve the charge.

19. The system of claim 14, wherein the pick and place apparatus includes a front tool arm with a rotatable first finger and a rear tool arm with a rotatable second finger such that the first finger and the second finger are rotated to a position underneath the tool to pick up the tool.

20. The system of claim 14, wherein the transfer unit includes a plurality of rail blocks upon which the charges and the tools are transported, each rail block being slidable within a rail slot that is oriented in the lateral direction and embedded in upper surfaces of the forming station, the cooling station, and the tool station.

21. The system of claim 20, wherein the rail blocks are positioned below the upper surfaces and actuated upward in order to transport the charges and the tools.

22. The system of claim 14, wherein the pick and place apparatus transports the first charge and the first tool above the second charge, the second tool, the third charge, and the third tool.

23. The system of claim 14, wherein the third charge is a finished composite material part when the third charge is transported from the cooling station to the tool station.

24. A method for forming composite material parts utilizing a system that operates in an axial direction and an orthogonal lateral direction, the method comprising the steps of:

a) placing a first charge in a charge station and a first tool in a tool station;
b) aligning the first charge in the axial direction with a plurality of alignment rollers that are operable to raise above an upper surface of the charge station to align and move the first charge in the axial direction and a plurality of end stops operable to contact the first charge along opposing ends;
c) aligning the first charge in the lateral direction with at least one centering gripper including first and second spaced-apart arms that are operable to contact the first charge along opposing sides;
d) forming a second charge against a second tool using a forming station;
e) cooling a third charge and a third tool using a cooling station;
f) moving the first charge and the first tool to the forming station using a pick and place apparatus; and
g) moving the second charge and the second tool to the cooling station and the third charge and the third tool to the tool station using a transfer unit.

25. The method of claim 24, further including step h) comprising retrieving the third charge from the tool station.

26. The method of claim 25, further including step i) comprising repeating steps a) through h).

27. The method of claim 24, wherein the first charge and the first tool are moved to the forming station above the second charge, the second tool, the third charge, and the third tool.

28. The method of claim 24, wherein the second charge, the second tool, the third charge, and the third tool are moved along rail slots embedded in the forming station, the cooling station, and the tool station.

29. The method of claim 24, wherein forming includes heating the second charge and the second tool while pressing the second charge against the second tool.

* * * * *